US008482700B2

(12) United States Patent
Segawa et al.

(10) Patent No.: US 8,482,700 B2
(45) Date of Patent: Jul. 9, 2013

(54) PANEL FOR LIQUID CRYSTAL DISPLAY DEVICE

(75) Inventors: Shinpei Segawa, Himeji (JP); Hiroaki Iwato, Mobara (JP); Yoshiki Watanabe, Isumi-gun (JP); Kazumi Kanesaka, Chosei-gun (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 390 days.

(21) Appl. No.: 12/825,751

(22) Filed: Jun. 29, 2010

(65) Prior Publication Data
US 2010/0328588 A1    Dec. 30, 2010

(30) Foreign Application Priority Data

Jun. 30, 2009  (JP) .................................. 2009-155931

(51) Int. Cl.
*G02F 1/1335* (2006.01)
(52) U.S. Cl.
USPC ............ 349/106; 349/107; 349/108; 349/109
(58) Field of Classification Search
USPC .................................. 349/106, 107, 108, 109
See application file for complete search history.

(56) References Cited

U.S. PATENT DOCUMENTS

| 6,118,505 | A  | * | 9/2000 | Nagata et al. ................. 349/106 |
| 7,139,058 | B2 | * | 11/2006 | Son et al. ...................... 349/141 |
| 2005/0142465 | A1 | | 6/2005 | Park et al. |
| 2008/0036949 | A1 | * | 2/2008 | Kim et al. ..................... 349/106 |

FOREIGN PATENT DOCUMENTS

| JP | 60-3609 | 1/1985 |
| JP | 9-265062 | 10/1997 |
| JP | 2005-227753 | 8/2002 |
| JP | 2003-195279 | 7/2003 |
| JP | 2004-198919 | 7/2004 |
| JP | 2005-148214 | 6/2005 |
| JP | 2005-196161 | 7/2005 |

* cited by examiner

*Primary Examiner* — Lucy Chien
(74) *Attorney, Agent, or Firm* — Antonelli, Terry, Stout & Kraus, LLP.

(57) ABSTRACT

A panel for a liquid crystal display device includes: a first mother substrate for cutting out color filter substrates including a first cell area corresponding to a first cell and a second cell area corresponding to a second cell therefrom; a first colored layer arranged in the first cell area of the first mother substrate; a second colored layer arranged in the second cell area of the first mother substrate; a second mother substrate for cutting out array substrates therefrom; and liquid crystal sandwiched between the first mother substrate and the second mother substrate. The first colored layer and the second colored layer are made of the same material and have portions which have the same thickness. A hole is formed in the second colored layer so as to make color reproducibility of the second colored layer lower than color reproducibility of the first colored layer.

10 Claims, 8 Drawing Sheets

PANEL FOR LIQUID CRYSTAL DISPLAY DEVICE

CROSS-REFERENCE TO RELATED APPLICATION

The present application claims priority from Japanese application JP2009-155931 filed on Jun. 30, 2009, the content of which is hereby incorporated by reference into this application.

BACKGROUND OF THE INVENTION

1. Field of the Invention

The present invention relates to a panel for a liquid crystal display device.

2. Description of the Related Art

There has been known a technique in which plural kinds of liquid crystal display panels are integrally manufactured using mother glass substrates and, thereafter, individual liquid crystal display panels are cut out (JP 60-3609 A, JP 9-265062 A, JP 2005-148214 A). To be in more detail, a pair of mother glass substrates is used in a state where TFT (Thin Film Transistor) substrates and color filter substrates are adhered to each other, and individual liquid crystal display panels are cut out.

Colored layers of the color filter substrate are formed by patterning a pigment-dispersed resist layer. The colored layers having the same color are formed of a single pigment dispersed resist layer and hence, the colored layers have the same thickness.

Recently, there have been proposed techniques in which plural kinds of liquid crystal display panels are simultaneously manufactured from one sheet of mother glass substrate. The liquid crystal display panels differ from each other in color reproducibility of color filters depending on usages. For example, there has been known a liquid crystal display panel in which color reproducibility is lowered for assigning priority to high brightness or low power consumption of a backlight or a liquid crystal display panel in which color reproducibility is increased for assigning priority to display ability. The difference in color reproducibility can be realized by changing the thicknesses of colored layers when the colored layers are made of the same material.

However, to form the colored layers having different thicknesses, even when the colored layers have the same color, it is necessary to increase the number of steps of forming the pigment-dispersed resist layer or to change an exposure quantity at the time of performing the exposure for every product.

SUMMARY OF THE INVENTION

It is an object of the invention to easily form color filters which differ in color reproducibility from one sheet of mother substrate.

(1) According to one aspect of the invention, there is provided a panel for a liquid crystal display device including: a first mother substrate for cutting out a plurality of color filter substrates including a first cell area corresponding to a first cell and a second cell area corresponding to a second cell therefrom; a first colored layer which is arranged in the first cell area of the first mother substrate; a second colored layer which is arranged in the second cell area of the first mother substrate; a second mother substrate for cutting out a plurality of array substrates; and liquid crystal which is sandwiched between the first mother substrate and the second mother substrate, wherein the first colored layer and the second colored layer are made of the same material and have portions which have the same thickness, and a hole is formed in the second colored layer so as to make color reproducibility of the second colored layer lower than color reproducibility of the first colored layer.

According to the invention, although the first colored layer and the second colored layer differ from each other with respect to whether or not the layers have the hole, the first colored layer and the second colored layer have the portions which have the same thickness and hence, it is possible to simultaneously and easily form color filters which differ in color reproducibility from one sheet of mother substrate.

(2) In the panel for a liquid crystal display device having the constitution (1), the second cell area may be smaller than the first cell area.

(3) In the panel for a liquid crystal display device having the constitution (1) or (2), the second colored layer may include a plurality of divided areas correspondingly to a multi-domain method for enlarging an angle of visibility, and the hole may be formed in the plurality of respective divided areas.

(4) In the panel for a liquid crystal display device having any one of the constitutions (1) to (3), the second colored layer may include a first color material portion, a second color material portion and a third color material portion which differ from each other in color, the hole may be constituted of a first hole formed in the first color material portion, a second hole formed in the second color material portion, and a third hole formed in the third color material portion, and a ratio at which an opening area of the first hole occupies in the first color material portion, a ratio at which an opening area of the second hole occupies in the second color material portion, and a ratio at which an opening area of the third hole occupies in the third color material portion may be individually adjusted.

(5) In the panel for a liquid crystal display device having any one of the constitutions (1) to (4), an achromatic light-transmitting material layer may be formed in the inside of the hole formed in the second colored layer.

(6) In the panel for a liquid crystal display device having any one of the constitutions (1) to (4), the hole formed in the second colored layer may be formed of a non-penetrating indentation.

(7) In the panel for a liquid crystal display device having any one of the constitutions (1) to (6), an overcoat layer may be arranged to be brought into contact with an inner surface of the hole.

(8) According to another aspect of the invention, there is provided a panel for a liquid crystal display device including: a pair of substrates with a liquid crystal layer sandwiched therebetween; and a color filter layer which is formed on either one of the pair of substrates, wherein the color filter layer includes a first color material portion, a second color material portion and a third color material portion which differ in color, a first hole formed in the first color material portion, a second hole formed in the second color material portion, and a third hole formed in the third color material portion, and a ratio at which an opening area of the first hole occupies in the first color material portion, a ratio at which an opening area of the second hole occupies in the second color material portion, and a ratio at which an opening area of the third hole occupies in the third color material portion differ from each other.

(9) In the panel for a liquid crystal display device having the constitution (8), an achromatic light-transmitting material layer may be formed in the inside of the first hole, the second hole and the third hole.

(10) In the panel for a liquid crystal display device having the constitution (8), the first hole, the second hole and the third hole may be formed of a non-penetrating indentation.

DETAILED DESCRIPTION OF THE INVENTION

Hereinafter, embodiments of the invention are explained in conjunction with the drawings.

First Embodiment

Figure 1:
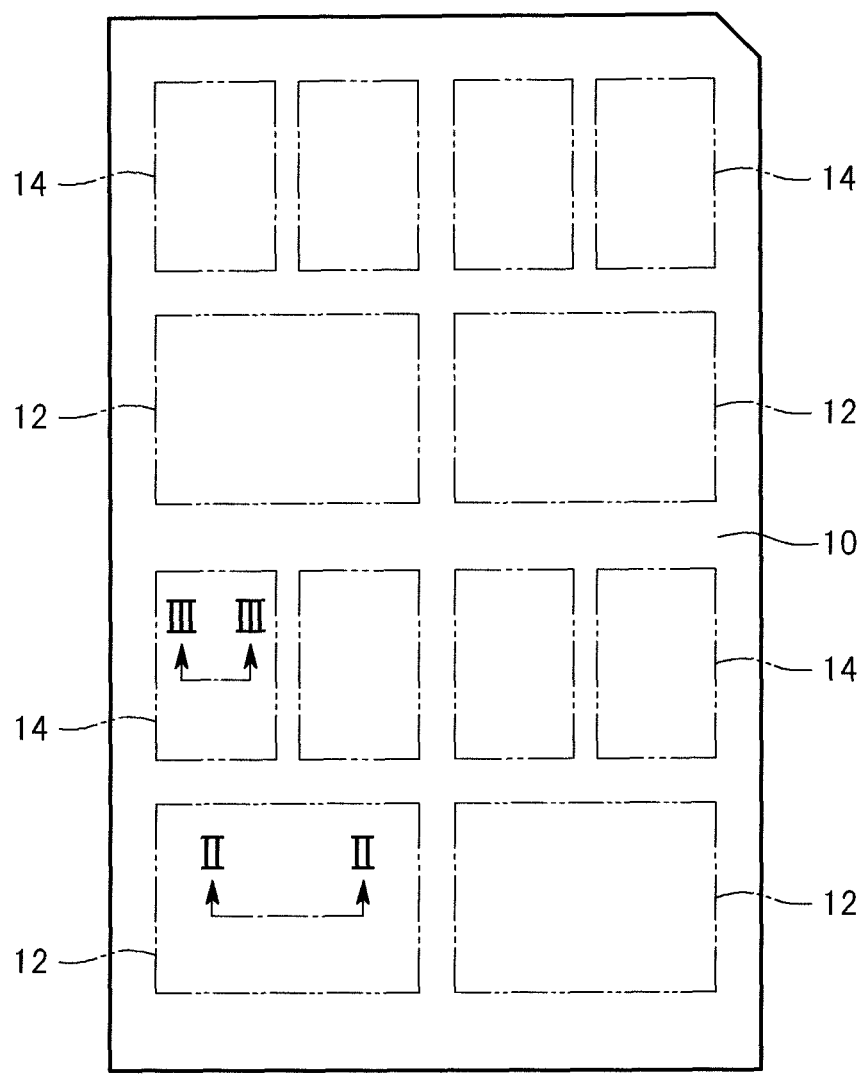
FIG. 1 is a schematic view showing a panel for a liquid crystal display device according to a first embodiment of the invention.
Figure 2:
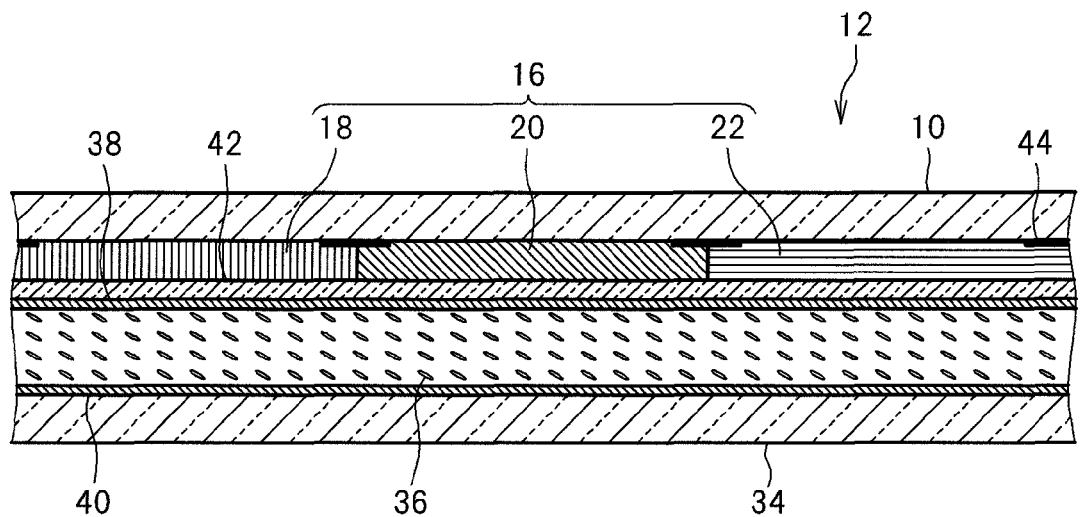
FIG. 2 is a partially enlarged cross-sectional view of the panel for a liquid crystal display device shown in FIG. 1 taken along a line II-II.
Figure 3:
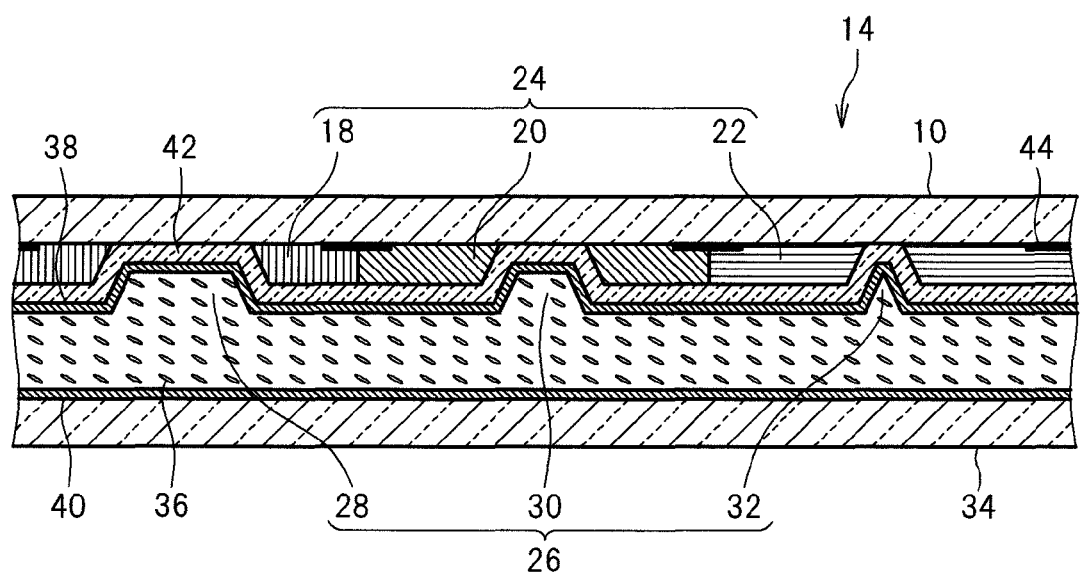
FIG. 3 is a partially enlarged cross-sectional view of the panel for a liquid crystal display device shown in FIG. 1 taken along a line III-III.

FIG. 1 is a schematic view showing a panel for a liquid crystal display device according to a first embodiment of the invention. FIG. 2 is a partially enlarged cross-sectional view of the panel for a liquid crystal display device shown in FIG. 1 taken along a line II-II. FIG. 3 is a partially enlarged cross-sectional view of the panel for a liquid crystal display device shown in FIG. 1 taken along a line The panel for a liquid crystal display device is provided for cutting out a plurality of liquid crystal display panels therefrom.

The panel for a liquid crystal display device includes a first mother substrate 10 made of glass, for example. The first mother substrate 10 is provided for cutting out a plurality of color filter substrates therefrom. As shown in FIG. 1, the first mother substrate 10 includes a plurality of first cell areas 12 which correspond to a plurality of first cells (each cell constituting the liquid crystal display panel) respectively, and a plurality of second cell areas 14 which correspond to a plurality of second cells (each being liquid crystal display panel) respectively. The second cell area 14 is set smaller than the first cell area 12. That is, it is possible to form a plurality of large-sized liquid crystal display panels corresponding to the plurality of first cells and a plurality of small-sized liquid crystal display panels corresponding to the plurality of second cells from the panel for a liquid crystal display device by cutting. As a modification of the panel for a liquid crystal display device, the first cell area 12 and the second cell area 14 may have the same size.

Figure 4:
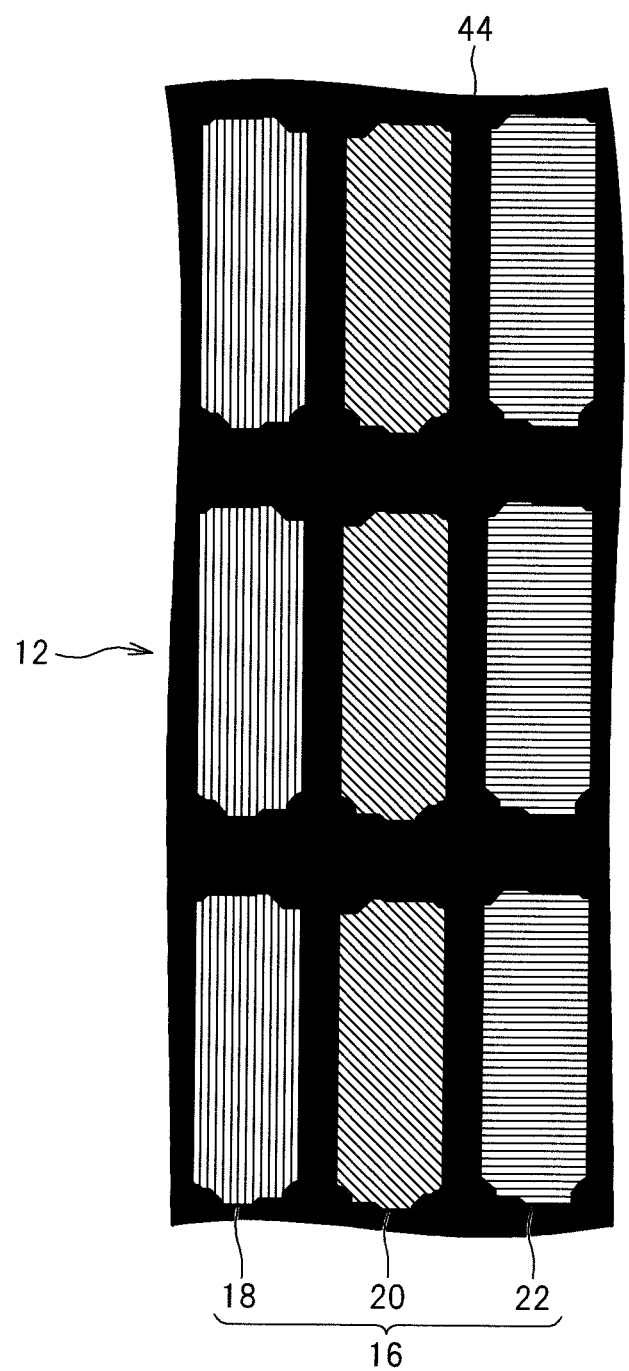
FIG. 4 is a plan view showing a portion of a first colored layer.

As shown in FIG. 2, a first colored layer 16 is arranged in the first cell area 12. The first colored layer 16 is constituted of a first color material portion 18, a second color material portion 20 and a third color material portion 22 which differ from each other in color, and the first colored layer 16 constitutes a color filter. FIG. 4 is a plan view showing a portion of the first colored layer 16.

Figure 5:
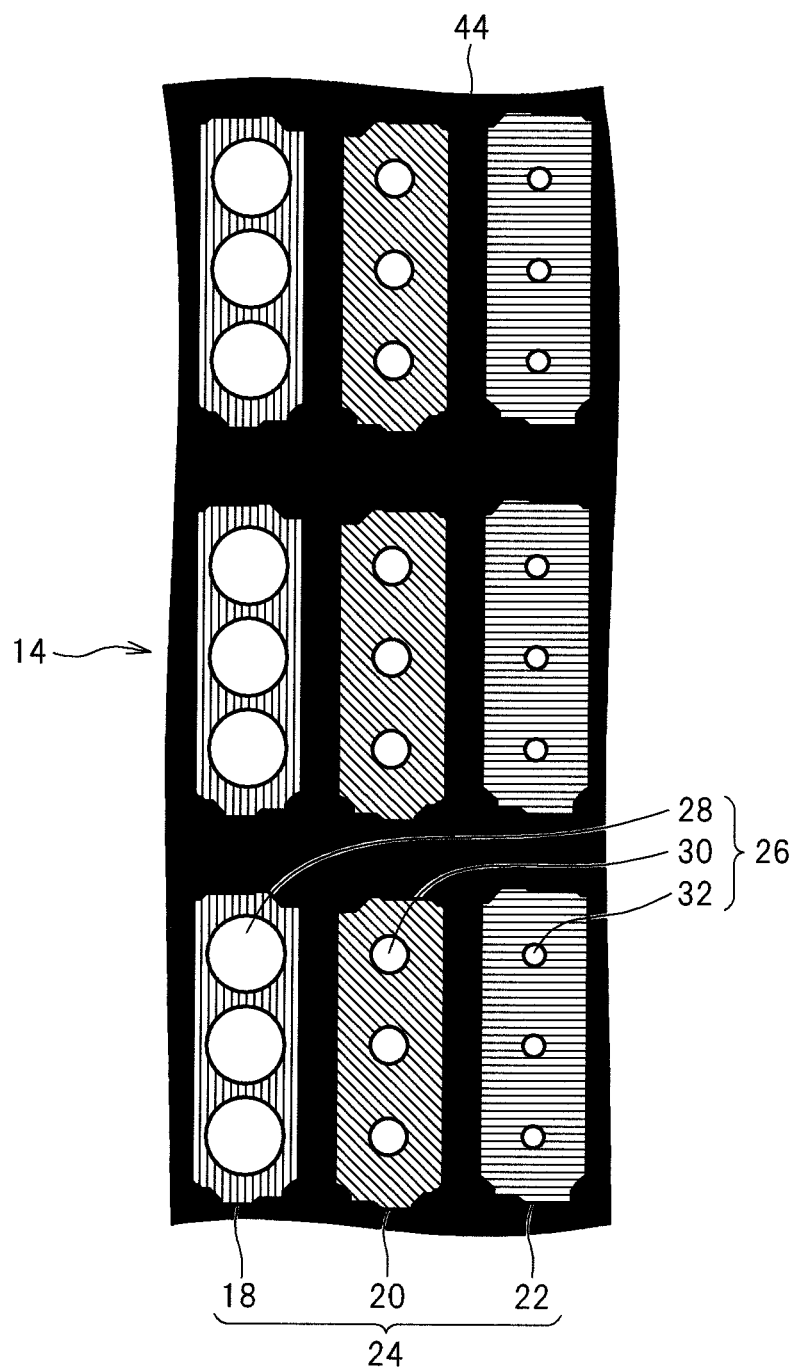
FIG. 5 is a plan view showing a portion of a second colored layer.

As shown in FIG. 3, a second colored layer 24 is arranged in the second cell area 14. The second colored layer 24 is constituted of a first color material portion 18, a second color material portion 20 and a third color material portion 22 which differ from each other in color, and the second colored layer 24 constitutes a color filter. FIG. 5 is a plan view showing a portion of the second colored layer 24.

The first colored layer 16 and the second colored layer 24 are made of the same material, and have portions which have the same thickness. For example, in a case where a pigment dispersion method is adopted for forming the first colored layer 16 and the second colored layer 24, these colored layers are formed using a resin precursor in which pigment is dispersed. To be more specific, the first color material portion 18 of the first colored layer 16 and the first color material portion 18 of the second colored layer 24 are simultaneously formed. The second color material portion 20 of the first colored layer 16 and the second color material portion 20 of the second colored layer 24 are simultaneously formed. The third color material portion 22 of the first colored layer 16 and the third color material portion 22 of the second colored layer 24 are simultaneously formed.

By making use of a die coater, a spin coater or the like, a thickness of a layer which is made of the resin precursor and is formed by performing a process one time can be made uniform. Then, a resin curing process is performed. When photolithography is adopted, processes such as exposure, development and baking are performed.

In this embodiment, although the first colored layer 16 and the second colored layer 24 are formed of a layer made of the same material and having the same thickness, the first colored layer 16 and the second colored layer 24 are formed such that these layers 16, 24 differ from each other in color reproducibility when used as color filters. To realize such difference in color reproducibility between the first colored layer 16 and the second colored layer 24, while no hole is formed in the first colored layer 16 (see FIG. 4), holes (openings) 26 are formed in the second colored layer 24 (see FIG. 5) for making color reproducibility of the second colored layer 24 lower than color reproducibility of the first colored layer 16. The holes 26 can be easily formed with the use of photolithography.

The holes 26 formed in the second colored layer 24 are constituted of first holes 28 formed in the first color material portion 18, second holes 30 formed in the second color material portion 20, and third holes 32 formed in the third color material portion 22. By adjusting a ratio at which an opening area of the first holes 28 occupies in the first color material portion 18, a ratio at which an opening area of the second holes 30 occupies in the second color material portion 20, and a ratio at which an opening area of the third holes 32 occupies in the third color material portion 22 respectively, the second colored layer 24 acquire the desired color reproducibility. That is, by making the opening area ratios different from each other, the second colored layer 24 can obtain the different color reproducibility.

Figure 6:
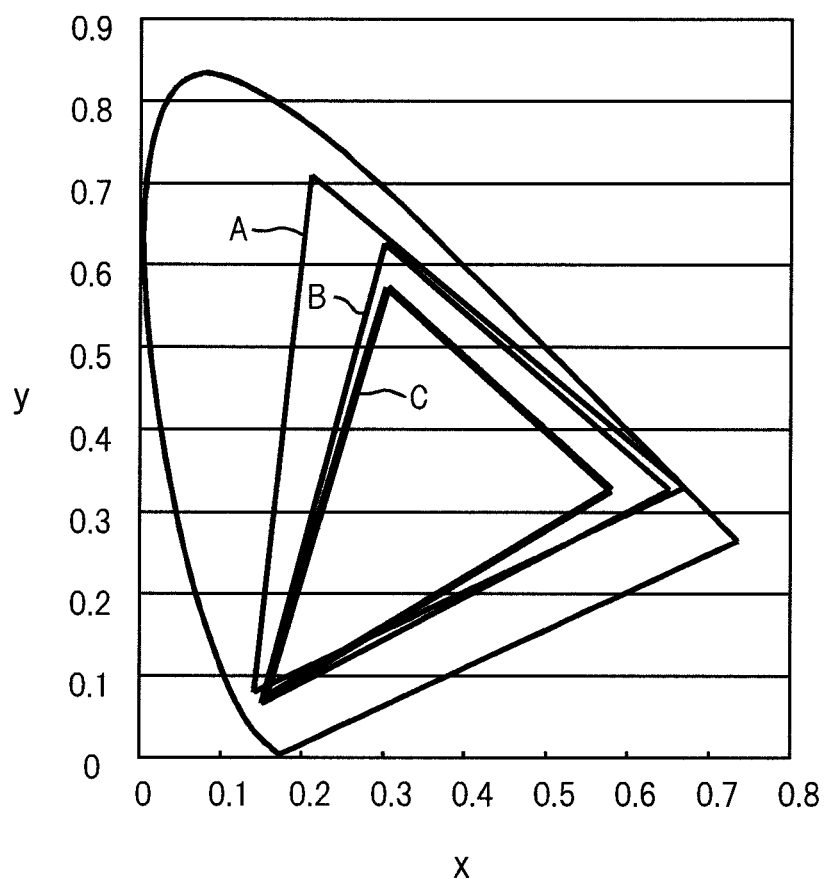
FIG. 6 is a CIE (Commission Internationale del'Eclairage) chromaticity diagram for explaining color reproducibility.

FIG. 6 is a CIE (Commission Internationale del'Eclairage) chromaticity diagram provided for explaining color reproducibility. In FIG. 6, a horseshoe-shaped portion indicates a visible region of a viewer. A triangle "A" indicates a color reproducing range in accordance with NTSC (National Television Standards Committee) Standards. A triangle "B" arranged inside the triangle "A" indicates a color reproducing region of a colored layer in which no hole is formed. For example, the triangle "B" indicates an example where an NTSC ratio is 75%. A triangle "C" indicates a color reproducing region of a colored layer in which a hole is formed with an NTSC ratio of 55%.

According to this embodiment, although the first colored layer 16 and the second colored layer 24 differ from each other with respect to the point that the first colored layer 16 has no hole and the second colored layer 24 has holes, the first colored layer 16 and the second colored layer 24 have the portions which have the same thickness. Accordingly, by merely forming a hole forming pattern on a photo mask for exposure, processes for forming first colored layer 16 and the second colored layer 24 which are performed before the formation of the holes 26 can be performed simultaneously. As a result, it is possible to easily form color filters which differ in color reproducibility from one sheet of mother substrate.

As shown in FIG. 2 and FIG. 3, the panel for a liquid crystal display device includes a second mother substrate 34 made of glass, for example, which is provided for cutting out a plurality of array substrates. The second mother substrate 34 includes thin film field effect transistors, pixel electrodes, lines and the like, and is also referred to as a TFT (Thin Film Transistor) substrate. A driving method of the panel for a liquid crystal display device may be any method such as an IPS (In Plane Switching) method, a TN (Twisted Nematic) method, or a VA (Vertical Alignment) method, and electrodes and lines which are compatible with the driving method are formed on the second mother substrate 34.

As shown in FIG. 2 and FIG. 3, liquid crystal (liquid crystal layer) 36 is sandwiched between the pair of substrates (first mother substrate 10 and second mother substrate 34). To be in more detail, the liquid crystal 36 is arranged between a first alignment film 38 adhered to the first mother substrate 10 and a second alignment film 40 adhered to the second mother substrate 34. An overcoat layer 42 is formed on the color filter layers (first colored layer 16 and second colored layer 24) which are formed on the first mother substrate 10. The overcoat layer 42 is arranged to be brought into contact with inner surfaces of the holes 26. Indentations are formed on a surface of the overcoat layer 42 correspondingly to the holes 26. Further, the overcoat layer 42 is brought into contact with the first mother substrate 10 through the holes 26. Here, the overcoat layer 42 may be omitted when required. The first alignment film 38 is arranged on the overcoat layer 42. A black matrix 44 is arranged between the first mother substrate 10 and the first colored layer 16 and between the first mother substrate 10 and the second colored layer 24.

Thereafter, the panel for a liquid crystal display device according to this embodiment is cut into the plurality of liquid crystal display panels. To be more specific, it is possible to obtain a plurality of large-sized liquid crystal display panels and a plurality of small-sized liquid crystal display panels. Further, it is possible to obtain liquid crystal display panels which have the same size although the liquid crystal display panels differ from each other in color reproducibility.

Second Embodiment

Figure 7:
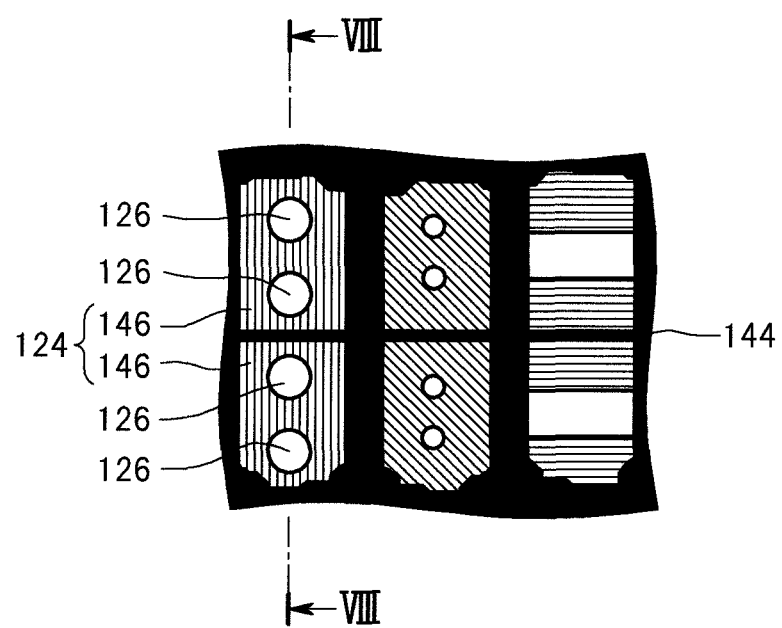
FIG. 7 is a view showing a portion of a panel for a liquid crystal display device according to a second embodiment of the invention.
Figure 8:
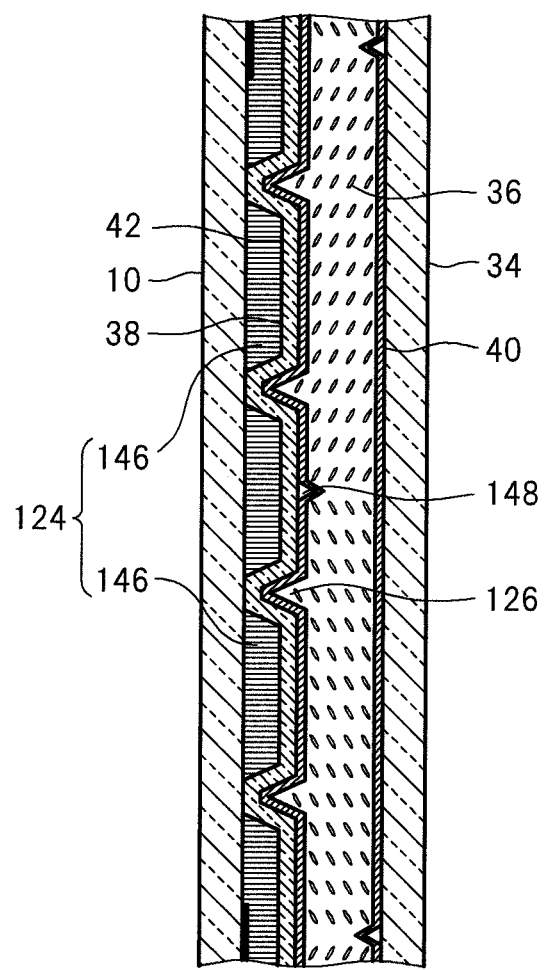
FIG. 8 is an enlarged cross-sectional view of the panel for a liquid crystal display device shown in FIG. 7 taken along a line VIII-VIII.

FIG. 7 is a view showing a portion of a panel for a liquid crystal display device according to a second embodiment of the invention. FIG. 8 is an enlarged cross-sectional view of the panel for a liquid crystal display device shown in FIG. 7 taken along a line VIII-VIII.

In this embodiment, a multi-domain method is adopted for enlarging an angle of visibility. In the multi-domain method, two or more areas each of which has different alignment state of a liquid crystal molecule are present in one pixel. A second colored layer 124 includes a plurality of divided areas 146 correspondingly to a multi-domain method. The plurality of divided areas 146 each of which has a different alignment state are partitioned by a projecting portion 148. The above-mentioned constitutions are substantially applicable to a first colored layer not shown in the drawing.

To eliminate the difference in color attributed to a visual angle, holes 126 are formed in the plurality of respective divided areas 146 of the second colored layer 124 in such a manner that the respective divided areas have the same opening area. Other constitutions of this embodiment are substantially equal to the corresponding constitutions explained in conjunction with the first embodiment.

Modification

Figure 9:
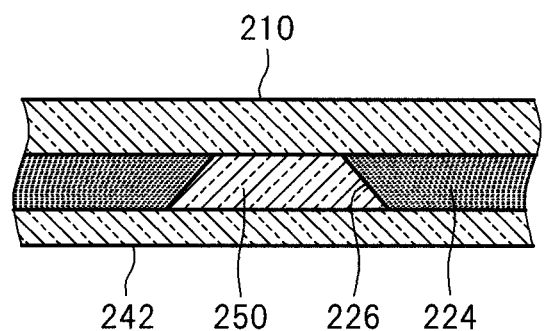
FIG. 9 is a view showing a second colored layer according to a modification 1.

FIG. 9 is a view showing a second colored layer according to a modification 1. In this modification, an achromatic light-transmitting material layer 250 made of a resin, for example, is formed in a hole 226 formed in the second colored layer 224. An overcoat layer 242 is formed over the second colored layer 224 and the light-transmitting material layer 250. Here, the overcoat layer 242 may be omitted when required. Other constitutions of this embodiment are substantially equal to the corresponding constitutions explained in conjunction with the above-mentioned embodiments.

Figure 10:
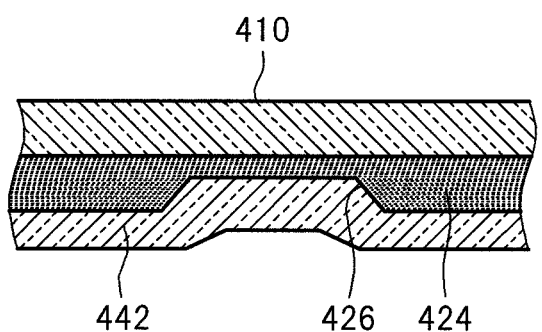
FIG. 10 is a view showing a second colored layer according to a modification 2.

FIG. 10 is a view showing a second colored layer according to a modification 2. In this modification, a hole 426 formed in a second colored layer 424 is a non-penetrating indentation. Also in this modification, an overcoat layer 442 is arranged to be brought into contact with an inner surface of the hole 426. A portion of the overcoat layer 442 is filled in the hole 426. Indentations are also formed on a surface of the overcoat layer 442 correspondingly to the holes 426. Here, the overcoat layer 442 may be omitted when unnecessary. Other constitutions of this modification correspond to the corresponding constitutions explained in conjunction with the above-mentioned embodiments.

The invention is not limited to the above-mentioned embodiments, and various modifications are conceivable. For example, the constitutions explained in the above-mentioned embodiments can be replaced with the constitution which is substantially equal to the above-mentioned constitutions, the constitution by which the same manner of operation and the same advantageous effect as the above-mentioned embodiments can be obtained, or the constitution which can achieve the same object as the above-mentioned constitutions.

What is claimed is:

1. A panel for a liquid crystal display device comprising:
   a first mother substrate for cutting out a plurality of color filter substrates, the first mother substrate including a first cell area corresponding to a first cell for forming a first liquid crystal panel and a second cell area corresponding to a second cell for forming a second liquid crystal panel from the first mother substrate;
   a first colored layer which is arranged in the first cell area of the first mother substrate;
   a second colored layer which is arranged in the second cell area of the first mother substrate;
   a second mother substrate for cutting out a plurality of array substrates therefrom corresponding to the first and second liquid crystal panels from the second mother substrate; and liquid crystal which is sandwiched between the first mother substrate and the second mother substrate, wherein the first colored layer and the second colored layer are made of the same material and have portions which have the same thickness, and a hole is formed in the second colored layer without a hole being formed in the first colored layer so as to make color reproducibility of the second colored layer lower than color reproducibility of the first colored layer.

2. The panel for a liquid crystal display device according to claim 1, wherein the second cell area is smaller than the first cell area.

3. The panel for a liquid crystal display device according to claim 1, wherein the second colored layer includes a plurality of divided areas correspondingly to a multi-domain method for enlarging an angle of visibility, and the hole is formed in each of the plurality of divided areas.

4. The panel for a liquid crystal display device according to claim 1, wherein the second colored layer includes a first color material portion, a second color material portion and a third color material portion which differ from each other in color, the hole is constituted of a first hole formed in the first color material portion, a second hole formed in the second color material portion, and a third hole formed in the third color material portion, and a ratio at which an opening area of the first hole occupies in the first color material portion, a ratio at which an opening area of the second hole occupies in the second color material portion and a ratio at which an opening area of the third hole occupies in the third color material portion are individually adjusted.

5. The panel for a liquid crystal display device according to claim 1, wherein an achromatic light-transmitting material layer is formed in the inside of the hole formed in the second colored layer.

6. The panel for a liquid crystal display device according to claim 1, wherein the hole formed in the second colored layer is formed of a non-penetrating indentation.

7. The panel for a liquid crystal display device according to claim 1, wherein the panel for a liquid crystal display device further includes an overcoat layer which is brought into contact with an inner surface of the hole.

8. A panel for a liquid crystal display device comprising:

a pair of substrates with a liquid crystal layer sandwiched therebetween; and a color filter layer which is formed on either one of the pair of substrates, wherein the color filter layer includes a first color material portion, a second color material portion and a third color material portion which differ in color, the first color material portion having a first hole formed therein, the second color material portion having a second hole formed therein, the third color material portion having a third hole formed therein, and a ratio at which an opening area of the first hole occupies in the first color material portion, a ratio at which an opening area of the second hole occupies in the second color material portion and a ratio at which an opening area of the third hole occupies in the third color material portion differ from each other.

9. The panel for a liquid crystal display device according to claim 8, wherein an achromatic light-transmitting material layer is formed in the inside of the first hole, the second hole and the third hole.

10. The panel for a liquid crystal display device according to claim 8, wherein the first hole, the second hole and the third hole are formed of a non-penetrating indentation.

\* \* \* \* \*